Feb. 15, 1944.  D. M. JOHNSON  2,341,787
SERVICE AND MAINTENANCE SYSTEM
Filed Aug. 11, 1942
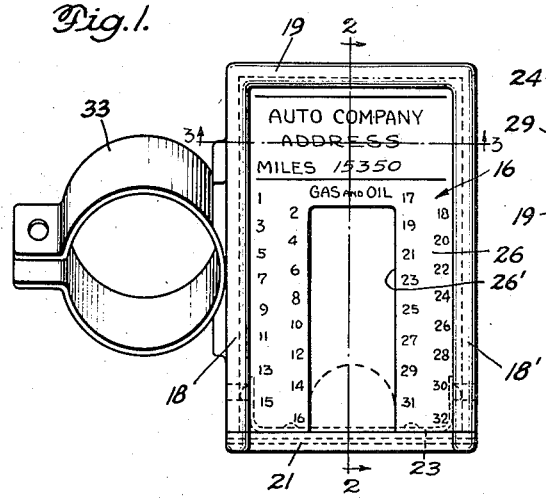
Inventor
DARRELL M. JOHNSON,
By A. Yates Dowell
Attorney Patented Feb. 15, 1944

2,341,787

UNITED STATES PATENT OFFICE 2,341,787

SERVICE AND MAINTENANCE SYSTEM

Darrell M. Johnson, Thomson, Ga.

Application August 11, 1942, Serial No. 454,445

7 Claims. (Cl. 281—10)

This invention relates to a service or maintenance system for motor vehicles, and has in view the provision of apparatus whereby the owner of an automobile or like vehicle may receive efficient servicing of his car in cooperation with one or more service stations or garages without depending upon his memory and without requiring individual memoranda, stickers or the like.

The average car owner is particular in regard to certain service operations, such as changing of oil in the crankcase, lubrication, battery and tires, but there are numerous other operations of major and minor importance which if not given attention in proper time result in rapid wear and deterioration of the vehicle. Even in connection with the usual or more common services, the average owner is lax or ofttimes confused. Service stations and garages usually apply labels or so-called "stickers" showing when different services have been performed, the stickers being applied in out-of-the-way places on the car. These ofttimes become lost, the indicia obliterated or cause confusion due to one being placed at one point and another on the car.

The present system and apparatus is designed to relieve a car owner of all worry in regard to services, and in addition it is of considerable help to the service man in that it affords a dependable check-up without danger of overlooking service operations of both a major and minor nature. It also assists in establishing the standing of dependable service stations and garages and insures against fraudulent or "cheating" practices by unscrupulous attendants and owners because all services are handled in close cooperation with the owner.

The foregoing and other objects and advantages of the improved system will become apparent in view of the following description taken in conjunction with the drawing, wherein:

Fig. 1 is a plan view of a ticket case or cabinet forming part of the system;

Figs. 2 and 3, longitudinal and transverse sections taken substantially on the lines 2—2 and 3—3, Fig. 1;

Fig. 4 is a plan view of a work sheet or chart for use with the case of Figs. 1, 2 and 3; and Fig. 5 a view similar to Fig. 4 of a detail or break-down operations sheet or service chart.

In carrying out the system, I utilize a work sheet which is based on the service operations usually enumerated by car manufacturers in the car manual and/or selected in accordance with individual requirements of the car owner and which calls for certain services over certain periods determined by mileage or time. Usually, the services are predicated on the number of miles traveled by the car. Thus, as shown in Fig. 4, the work sheet or chart has a series of operations in the left-hand column which are listed in the order of most frequent occurrence, viz, those operations which occur within the least number of miles are given preference in numerical order. In this manner the most frequent operation becomes the basis for all subsequent operations.

The column of numbers indicated at 10 are operation numbers and will be subsequently referred to in connection with the ticket case of Figs. 1, 2 and 3. The second column, indicated at 11, lists the types of services, for example "Air in tires" is listed as operation 1, "Storage battery" operation as 2, and "Lubrication" as operation 3, etc. The next column, indicated at 12, gives mileage intervals over which the services are to be performed as recommended by the car manufacturer or changed to an interval preferred by the customer. The column 13 gives the number of miles which the car has traveled when the service is inaugurated. The column 14 gives the mileage at which the service was last performed and is the figure to which is added the agreed interval, to secure figures for the "Next mileage" column, indicated at 15. This latter column gives the miles when the next service should be rendered and is arrived at by addition of figures in columns 12 and 14.

The successive columns from the "Next mileage" column on are "Ticket" columns and into these columns the respective mileages are extended at which the various service jobs are to be made.

The most frequent operation interval furnishes the basic mileage for each "Ticket" column and is placed at the top of this column. Other operation extensions are placed in the column which is headed with mileage nearest the equal of this operation extension. With all figures in column 15 extended to the proper column, the work sheet is complete.

For example, let it be assumed that the storage battery is to be serviced every one hundred and fifty miles, and that the car has already travelled 15,217 miles and the last time the battery was serviced was at 15,200 miles. Then in column 15 will be placed the numeral 15,300 which is the sum of columns 12 and 14. In the first "Ticket" column the operation will start at 15,350 and will be progressively increased for each successive ticket column. This 150 mile interval is the most frequent of the entire list of operations in column 10 (except "Air and tires" which remains unfilled in Fig. 4). The lubricating and oil changing operations are shown as being the next most frequent of the group listed in Fig. 4, and hence these will be properly arranged in columns 12 to 15, inclusive, and then projected on out into the ticket columns wherever they come closest to the storage battery operation interval.

The work sheet or chart of Fig. 4 is primarily for the garage or service station and will be retained at this point for reference by a mechanic or attendant.

Each individual car-owner who takes advantage of the service will be given a series of tickets such as shown in Fig. 1 and generally indicated at 16, the tickets preferably being detachably linked in series by transverse score lines and mounted on a roll 17. Each of these tickets bears a series of numerals on opposite sides of a center memorandum space. The numbers on the tickets correspond to the numerals in the column 10 on the chart of Fig. 4. Each of these tickets constitutes a means for effecting transfer of the information from the proper column on the work sheet (Fig. 4) to what is in effect a reminder and memoranda file for the car owner. That is, first ticket for first column, second ticket for second column, and etc. The work sheet supplies the operation information, whereas the ticket supplies the information by the number of the operation. By the method of punching the operation number on the ticket, the work sheet information is transferred to the ticket. The ticket also carries the same mileage figure which heads the corresponding column on the work sheet.

The case of Figs. 1, 2 and 3 in its preferred form comprises side walls 18, 18', a rear end wall 19, a bottom wall 20. A door 21 is hinged at 22 to the bottom wall 20, and the side wall 18' is provided with a spring catch 23 adapted to engage the door 21 and releasably hold it in closed relation. The side walls 18, 18' are provided with longitudinal grooves 24 and 25 to respectively slidably receive a transparent lid or top cover 26 and a supporting plate or panel 27 between which the string of tickets are adapted to pass. The top cover 26 is formed with a recess as at 26' to render the memorandum portion of the ticket accessible. Both the transparent or glass cover 26 and top supporting slide 27 are preferably removable by sliding them endwise when the door 21 is opened.

The roll of tickets 17 is mounted on a reel 28 the opposite ends of which are journaled in vertical slots 29 formed in the side walls 18, 18', said slots 29 at their upper ends registering with the slide grooves 25 to facilitate loading of the reel.

A partition 30 is provided in spaced relation to the bottom wall 20 in order to form a compartment 31 for tickets which may be detached from the roll 17. A spring 32 is secured to the rear top portion of this partition and is adapted to engage the roll 17 and perform a braking action on the latter to prevent overrunning of the roll.

The case illustrated in Figs. 1, 2 and 3 may be sold as a car accessory or it may be provided as a separate unit and attached to the steering column, or to some other convenient support, by means of the spring clamp 33, note Fig. 1.

Fig. 5 illustrates a schedule of operations sheet or chart. This chart corresponds in general to the work sheet of Fig. 4 except that the respective operations are more detailed. For example, the number 2 operation of Fig. 4 is indicated as "Storage battery" while in Fig. 5 the service is indicated more in detail. This holds true with respect to all services enumerated in Fig. 4.

The manner in which the system operates may be briefly described as follows:

Each individual car owner who subscribes to the system or service is at the outset provided with one of the cases shown in Figs. 1, 2, and 3 and a group of tickets, say for example, fifteen. Each of these tickets at the time they are given the car owner or customer will have certain of the numbers thereon punched, same being transferred information from work sheet (Fig. 4) which was compiled by customer and attendant and each number will correspond to a number in the left hand column 10 of the chart of Fig. 4. The tickets will be arranged in series on the roll 17 so that when the first ticket is detached, the succeeding ticket which will be brought to view will have numbers punched thereon corresponding to services occurring in the order listed. When the car owner receives the services called for by one of the tickets, he detaches same from the string of tickets and inserts it in the bottom compartment 31. At that time, he may enumerate thereon the cost of the services rendered so that he will always have a self-serving cost list available.

The work sheet of Fig. 4 upon its completion by the customer and attendant, is retained by the garage owner or service station operator and remains in the files of the garage in order that it will be available when a second work sheet must be projected. When the owner comes in for service, he gives the ticket to the serviceman, who consults the chart (Fig. 5) and proceeds to render the service called for by the numbers on the ticket which are punched.

This system is a valuable service, not only for individual garages and service stations, but may also be used by automobile manufacturers and dealers who may provide identical work sheets to all of their subsidiaries and dealers and service stations and in this manner encourage owners of the cars manufactured by them to patronize their dealers and service men and to also provide a more thorough and efficient servicing system generally.

It will be understood that certain limited changes and rearrangement of parts of the invention may be made within the scope of the same as defined by the appended claims.

What is claimed is:

1. For use in a service and maintenance system for motor vehicles, a ticket case having a compartment for receiving a roll of tickets, a reel in said compartment mounting said roll, a panel slidingly mounted over said roll compartment, the case being provided with a slot whereby the tickets may be drawn from said roll over said panel and exposed on the face of the latter, a filing compartment beneath said roll compartment for receiving detached tickets for future reference, and a door at one end of the case, said door when open permitting sliding movement of said panel.

2. For use in a service and maintenance system for motor vehicles, a case for carrying memoranda tickets or slips comprising a compartment mounting a roll of tickets, a door at the front of said compartment, a panel slidingly mounted in said case over said roll compartment, said tickets being drawn downwardly over said panel, a transparent cover overlying said panel in spaced relation with respect thereto, said cover being transparent and having a recess therein rendering at least a portion of each ticket accessible for noting data thereon as it is drawn beneath said transparent cover.

3. A case for carrying memoranda tickets or slips comprising substantially parallel side walls, an end wall and a bottom wall providing a compartment in which a roll of tickets may be mounted, said side walls being provided with upper and lower pairs of slideways above said compartment, a panel slidingly mounted in the lower slideways and a transparent cover mounted in the upper set of slideways in spaced relation to said panel, said tickets being withdrawn from said roll and pulled over said panel beneath said transparent cover, said cover being formed with a recess rendering each of said tickets accessible for noting data thereon, a partition beneath said roll compartment and in spaced relation to the bottom wall of the case providing in conjunction with the bottom wall a compartment in which detached tickets may be filed for future reference, and a door hinged at the front end of the case, said door when open permitting removal of said panel and said top cover and also rendering said filing compartment accessible from the front of the case.

4. Service and maintenance equipment comprising a case or housing for tickets or slips for data relative to the service, said case being of a character to contain a roll of tickets and a ledge over which said tickets are adapted to be withdrawn, a ticket receiving compartment associated with the lower portion of said case for receiving tickets detached from the roll, and a door at the front of the case affording access to said compartment and the interior of the case including said ledge.

5. In a service and maintenance system employing a chart with spaces for designating indicia thereon and related memoranda tickets with indicia relative to certain data, a case or housing for the memoranda tickets before and after use and comprising a writing ledge over which the tickets are adapted to be withdrawn and serving as a support for the tickets when they are being written upon, means over said ledge defining the writing space on the tickets and indicative of the matter to be written, a compartment for used tickets, and a movable member affording access to the compartments in the case and the front end of said ledge.

6. A service and maintenance system employing a chart with spaces for indicia thereon and related memoranda tickets likewise with indicia thereon, a case housing having a plurality of compartments associated therewith, one for a roll of tickets and another for detached tickets, the former compartment having a substantially horizontal bottom wall and inclined top wall whereby the compartment is capable of containing a larger roll of tickets in the rear than at the front, said inclined top wall providing a writing ledge for supporting tickets to be written upon, said ledge being removable forwardly of the case, means over the ledge defining a writing space and suggestive of the matter to be written, and a door at the front of the case affording access to the compartments of the case and permitting removal of the ledge and the writing defining means to allow a roll of tickets to be inserted or removed from the case through its top.

7. A device of the character described including a maintenance chart, tickets containing data relative to said chart, and a case for carrying said tickets, said case comprising substantially parallel side walls, an end wall and a bottom wall providing a compartment in which a roll of tickets may be mounted, said side walls being provided with upper and lower pairs of slideways above said compartment, a panel slidingly mounted in the lower slideways and a transparent cover mounted in the upper set of slideways in spaced relation to said panel, said tickets being withdrawn from said roll and pulled over said panel beneath said transparent cover, said cover being formed with a recess rendering each of said tickets accessible for noting data thereon, a partition beneath said roll compartment and in spaced relation to the bottom wall of the case providing in conjunction with the bottom wall a compartment in which detached tickets may be filed for future reference, and a door hinged at the front end of the case, said door when open permitting removal of said panel and said top cover and also rendering said filing compartment accessible from the front of the case.

DARRELL M. JOHNSON.